(12) United States Patent
Kellerman et al.

(10) Patent No.: US 12,090,819 B2
(45) Date of Patent: *Sep. 17, 2024

(54) REMOVABLE PANEL ASSEMBLY FOR A VEHICLE WINDOW AND RELATED METHODS

(71) Applicant: K2 Products LLC, Amelia, OH (US)

(72) Inventors: Stephen M. Kellerman, Amelia, OH (US); Charles P. Kellerman, New Richmond, OH (US)

(73) Assignee: K2 Products LLC, Amelia, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,472

(22) Filed: Jul. 11, 2023

(65) Prior Publication Data

US 2023/0347720 A1    Nov. 2, 2023

Related U.S. Application Data

(63) Continuation of application No. 17/224,663, filed on Apr. 7, 2021, now Pat. No. 11,738,625.

(60) Provisional application No. 63/006,974, filed on Apr. 8, 2020.

(51) Int. Cl.
*B60J 1/08* (2006.01)
*B60J 1/00* (2006.01)
*B60J 1/20* (2006.01)

(52) U.S. Cl.
CPC .............. *B60J 1/085* (2013.01); *B60J 1/004* (2013.01); *B60J 1/2094* (2013.01)

(58) Field of Classification Search
CPC ........... B60J 1/085; B60J 1/004; B60J 1/2094
USPC ....................................... 296/146.15
See application file for complete search history.

(56) References Cited

U.S. PATENT DOCUMENTS

| | | | |
|---|---|---|---|
| 2,549,391 A | 4/1951 | Second | |
| 2,690,928 A | 10/1954 | Boynes | |
| 4,025,103 A | 5/1977 | Eichstaedt | |
| 4,058,221 A | 11/1977 | Elkins | |
| 4,231,501 A | 11/1980 | Goode | |
| 4,691,851 A | 9/1987 | Aeserude | |
| 4,986,209 A * | 1/1991 | Spica | B60Q 1/268 |
| | | | 116/28 R |
| 5,298,590 A | 3/1994 | Isogai et al. | |

(Continued)

FOREIGN PATENT DOCUMENTS

EP    2202108 A1    6/2010
JP    2004299674 A   10/2004

*Primary Examiner* — Amy R Weisberg
*Assistant Examiner* — Dana D Ivey
(74) *Attorney, Agent, or Firm* — Rooney IP, LLC

(57) ABSTRACT

A removable panel assembly for a vehicle window, the panel assembly includes a removable panel sized and shaped to overlie at least a portion of an outward-facing surface of a vehicle window. A first retainer is configured to secure the panel in abutting relation to the window, the first retainer including a first engagement element configured to engage a first edge of the window and a second engagement element configured to engage an inward-facing surface of the window. A second retainer is configured to secure the panel in abutting relation to the window, the second retainer including a third engagement element configured to engage a second edge of the window and a fourth engagement element configured to engage the inward-facing surface of the window.

18 Claims, 11 Drawing Sheets

(56) References Cited

U.S. PATENT DOCUMENTS

| | | | |
|---|---|---|---|
| 5,390,837 A | 2/1995 | Ruffolo, Jr. | |
| 6,298,590 B1 * | 10/2001 | Levinson | G09F 21/04 |
| | | | 40/643 |
| 6,446,375 B1 | 9/2002 | Davis | |
| 7,007,418 B2 | 3/2006 | Anderson | |
| 11,738,625 B2 * | 8/2023 | Kellerman | B60J 1/004 |
| | | | 296/146.15 |
| 2016/0023700 A1 | 1/2016 | Dugan | |

* cited by examiner

REMOVABLE PANEL ASSEMBLY FOR A VEHICLE WINDOW AND RELATED METHODS

CROSS REFERENCE TO RELATED APPLICATION

This application is a continuation of U.S. patent application Ser. No. 17/224,663 filed on Apr. 7, 2021, which claims the benefit of U.S. Provisional Patent Application Ser. No. 63/006,974 filed on Apr. 8, 2020, the disclosures of which are incorporated herein by reference in their entirety.

TECHNICAL FIELD

Embodiments relate generally to panels for covering vehicle windows, and, more specifically, to a removable panel assembly configured to overlie at least a portion of a vehicle window, and related methods.

BACKGROUND

Vehicles, such as automobiles and vans, may be modified for specific uses in certain industries. For example, in the funeral industry, automobiles are permanently modified by coachbuilders into specialized hearses or funeral coaches. Among other things, hearses and funeral coaches traditionally have a distinctive shape and include distinctive external decorative elements. These vehicles often include a landau bar (an ornamental S-shaped metallic bar historically associated with the folding roof structure on a landau carriage) on each side of the rear portion of the vehicle. These vehicles typically have a recognizable appearance and are generally used only in connection with the funeral business.

Other vehicles used in the funeral industry include "first call" vehicles, which are used to pick up the remains of a recently deceased person and transport the remains to a funeral home for preparation. Full-size vans, minivans, and sport-utility vehicles are commonly used as first call vehicles. Many first call vehicles include internal modifications to facilitate transportation of deceased persons; however, external modifications, such as funeral-industry-specific ornamentation, may or may not be desirable in particular circumstances. For example, for some uses, it may be desirable for a first call vehicle to be readily recognizable as a funeral vehicle, such as by including landau bars.

The same first call vehicle may also be used in circumstances when it is not desirable for the vehicle to be easily recognizable as a funeral vehicle. For example, it may be desirable for the remains of a recently deceased person to be removed from a particular location discreetly and without the presence of a recognizable funeral vehicle. Similarly, some funeral home operators may utilize a particular vehicle, such as a minivan, both in connection with their funeral business and for family transportation. Accordingly, the present disclosure contemplates that the ability to quickly and easily transform the external appearance of a vehicle between that of a standard vehicle and that of a recognizable funeral vehicle may be advantageous.

Some standard vehicles, such as certain minivans, include pivotable rear side windows. Removable landau panels (e.g., panels including landau bars) are available for some of these vehicles. Generally, these panels are installed or removed by sliding along the window while the window is in the open position, and shutting the window secures the panel in place. However, this type of panel is not usable on vehicles that do not include pivotable windows.

Accordingly, the present disclosure contemplates that there is a need for improved removable panels for vehicle windows, such as landau panels.

SUMMARY

Generally, a removable panel assembly for a vehicle window is provided and comprises a removable panel, a first retainer and a second retainer. The removable panel is sized and shaped to overlie at least a portion of an outward-facing surface of a vehicle window. The first retainer is configured to secure the panel in abutting relation to the window. The first retainer comprises a first engagement element configured to engage a first edge of the window and a second engagement element configured to engage an inward-facing surface of the window. The second retainer is configured to secure the panel in abutting relation to the window. The second retainer comprises a third engagement element configured to engage a second edge of the window and a fourth engagement element configured to engage the inward-facing surface of the window.

In alternative or additional aspects, the first retainer and the second retainer may be selectively connectable to the panel and selectively detachable from the panel. The first retainer may be selectively connectable to the panel by engagement of a first externally threaded connector with a first internally threaded connector; and the second retainer may be selectively connectable to the panel by engagement of a second externally threaded connector and a second internally threaded connector. When the first retainer is connected to the panel, at least one of the first externally threaded connector and the first internally threaded connector extends through the panel, the first externally threaded connector engages the first internally threaded connector, the first retainer comprising the first internally threaded connector. When the second retainer is connected to the panel, at least one of the second externally threaded connector and the second internally threaded connector extends through the panel, the second externally threaded connector engages the second internally threaded connector, the second retainer comprising the second internally threaded connector.

In some embodiments, the first edge and the second edge of the window are generally opposite edges of the window. The first retainer may further comprise a fifth engagement element configured to engage a third edge of the window and the second retainer may comprise a sixth engagement element configured to engage the third edge of the window. The panel may further comprise a third retainer configured to secure the panel in abutting relation to the window, the third retainer comprising at least one of a fifth engagement element configured to engage a fourth edge of the window and a sixth engagement element configured to engage the inward-facing surface of the window. The third retainer may comprise a generally U-shaped channel disposed proximate an edge of the panel.

On many vehicles, the outward-facing surface of the window is curved. The panel may be pre-curved to substantially conform to at least the portion of the outward-facing surface of the window. The panel may be flexible such that the panel is bendable to substantially conform to at least the portion of the outward-facing surface of the window.

In alternative embodiments, the panel comprises at least one ornamental element disposed on an outward-facing surface of the panel. The ornamental element may comprise a landau bar and at least one landau button. The at least one landau button may be coupled to at least one of the first externally threaded connector and the first internally threaded connector. Alternatively, the ornamental element may comprise an indicium associated with at least one of a sports team, a trade, and a business.

In alternative or additional aspects, the panel comprises a substrate and at least one of a covering and a coating. The substrate may comprise at least one of plastic, molded resin, fiberglass, sheet metal, and aluminum. The substrate may be generally rigid and the covering may be substantially flexible. The covering may comprise vinyl fabric.

In another embodiment, generally, a removable panel assembly for a vehicle window is provided and comprises a removable panel, a first retainer and a second retainer coupled together as part of a first retainer assembly. The removable panel is sized and shaped to overlie at least a portion of an outward-facing surface of a vehicle window. The first retainer comprises a first engagement element configured to engage a first edge of the window and a second engagement element configured to engage an inward-facing surface of the window. The second retainer is configured to secure the panel in abutting relation to the window. The second retainer comprises a third engagement element configured to engage a second edge of the window and a fourth engagement element configured to engage the inward-facing surface of the window.

The first retainer assembly may further comprise a first retainer assembly track. The panel may further comprise a first panel track disposed on an inward-facing surface of the panel. The panel may be selectively connectable to the first retainer assembly by sliding the panel with respect to the window to engage the first panel track with the first retainer assembly track.

The removable panel assembly may further comprise a third retainer and a fourth retainer coupled together as part of a second retainer assembly. The third retainer is configured to secure the panel in abutting relation to the window. The third retainer comprises a fifth engagement element configured to engage a first edge of the window and a sixth engagement element configured to engage the inward-facing surface of the window. The fourth retainer is configured to secure the panel in abutting relation to the window. The fourth retainer comprises a seventh engagement element configured to engage the second edge of the window and an eighth engagement element configured to engage the inward-facing surface of the window.

The second retainer assembly may further comprise a second retainer assembly track. The panel may further comprise a second panel track disposed on an inward-facing surface of the panel. The panel may be selectively connectable to the second retainer assembly by sliding the panel with respect to the window to engage the second panel track with the second retainer assembly track.

In some embodiments, the first panel track and the first retainer assembly track may be oriented generally horizontally wherein the panel is selectively connectable to the first retainer assembly by sliding the panel generally horizontally with respect to the window to engage first panel track with the first retainer assembly track. The second panel track and the second retainer assembly track may be oriented generally horizontally wherein the panel is selectively connectable to the second retainer assembly by sliding the panel generally horizontally with respect to the window to engage the second panel track with the second retainer assembly track.

In alternative embodiments, the first panel track and the first retainer assembly track may be oriented generally vertically wherein the panel is selectively connectable to the first retainer assembly by sliding the panel generally vertically with respect to the window to engage the first panel track with the first retainer assembly track. The second panel track and the second retainer assembly track may be oriented generally vertically wherein the panel is selectively connectable to the second retainer assembly by sliding the panel generally vertically with respect to the window to engage the second panel track with the second retainer assembly track.

In alternative embodiment, generally, a removable panel assembly for a vehicle window is provided and comprises a removable panel, a first retainer, and a second retainer. The removable panel is sized and shaped to overlie at least a portion of an outward-facing surface of a vehicle window. The first retainer is configured to secure the panel in abutting relation to the window. The first retainer comprises a first engagement element configured to engage a first edge of the window and a second engagement element configured to engage an inward-facing surface of the window. The second retainer is configured to secure the panel in abutting relation to the window. The second retainer comprising a third engagement element configured to engage a second edge of the window and a fourth engagement element configured to engage the inward-facing surface of the window. At least one of the first retainer and the second retainer is movably disposed on the inward-facing surface of the panel to selectively engage with the window.

The panel assembly may further comprise a first tightening mechanism. The first tightening mechanism is operatively coupled to at least one of the first retainer and the second retainer. The first tightening mechanism is configured to move at least one of the first retainer and the second retainer to engage the window.

The removable panel assembly may further comprise a third retainer, and a fourth retainer. The third retainer is configured to secure the panel in abutting relation to the window. The third retainer comprises a fifth engagement element configured to engage a first edge of the window and a sixth engagement element configured to engage an inward-facing surface of the window. The fourth retainer is configured to secure the panel in abutting relation to the window. The fourth retainer comprises a seventh engagement element configured to engage a second edge of the window and an eighth engagement element configured to engage the inward-facing surface of the window. At least one of the third retainer and the fourth retainer is movably disposed on the inward-facing surface of the panel to selectively engage with the window.

The panel assembly may further comprise a second tightening mechanism. The second tightening mechanism is operatively coupled to at least one of the third retainer and the fourth retainer to move at least one of the third retainer and the fourth retainer to engage the window.

In another embodiment, generally, a removable panel assembly for a vehicle window is provided and comprises a removable panel, a first retainer and a second retainer. The removable panel is sized and shaped to overlie at least a portion of an outward-facing surface of a vehicle window. The first retainer is configured to secure the panel in abutting relation to the window. The first retainer comprises a first engagement element configured to engage a first edge of the window and a second engagement element configured to engage an inward-facing surface of the window. The second retainer is configured to secure the panel in abutting relation to the window. The second retainer comprises a third engagement element configured to engage a second edge of the window and a fourth engagement element configured to engage the inward-facing surface of the window. The second retainer comprises a biasing element configured to bias the panel to hold the first retainer in engagement with the window.

In alternative or additional aspects, the first retainer may be configured to engage the top edge of the window and the biasing element may be configured to bias the panel generally downward. The biasing element may comprise a compression spring. The second retainer may comprise an elongated channel disposed generally along a bottom edge of the panel and the compression spring may be disposed in the channel.

Generally, a method of manufacturing a removable panel assembly for a vehicle window is provided and includes providing a removable panel sized and shaped to overlie at least a portion of an outward-facing surface of a vehicle window, providing a first retainer configured to secure the panel in abutting relation to the window, the first retainer comprising a first engagement element configured to engage a first edge of the window and a second engagement element configured to engage an inward-facing surface of the window, and providing a second retainer configured to secure the panel in abutting relation to the window, the second retainer comprising a third engagement element configured to engage a second edge of the window and a fourth engagement element configured to engage the inward-facing surface of the window.

In alternative or additional aspects, a method of manufacturing a removable panel assembly includes providing a first externally threaded connector and a first internally threaded connector configured to selectively connect the panel to the first retainer, and providing a second externally threaded connector and a second internally threaded connector configured to selectively connect the panel to the second retainer. The method may include providing a third retainer wherein the third retainer is configured to engage at least one of a fourth edge of the window and the inward-facing surface of the window, and the third retainer comprises a generally U-shaped channel disposed proximate an edge of the panel.

In some embodiments, the outward-facing surface of the window is curved. Providing the removable panel may include pre-curving the panel to substantially conform to at least the portion of the outward-facing surface.

In alternative or additional aspects, the panel may comprise a substrate and at least one of a covering and a coating and manufacturing the removable panel includes providing the substrate, and applying at least one of the covering and the coating to the substrate. The substrate may comprise at least one of molded plastic and fiberglass and manufacturing the substrate includes molding the substrate. The covering may comprise a vinyl fabric and manufacturing the substrate and the covering includes applying the vinyl fabric to the substrate. The removable panel may include disposing at least one ornamental element on an outward-facing surface of the panel.

Generally, a method of using a removable panel assembly is provided and includes disposing a first retainer on a vehicle window by engaging a first engagement element of the first retainer with a first edge of the window, engaging a second engagement element of the first retainer with an inward-facing surface of the window, disposing a second retainer on the vehicle window by engaging a third engagement element of the second retainer with a second edge of the window, engaging a fourth engagement element of the second retainer with the inward-facing surface of the window, and connecting a removable panel to the first retainer and the second retainer, the removable panel being in an abutting relation with at least a portion of an outward-facing surface of the vehicle window.

In alternative or additional aspects, a method of using a removable panel assembly may include connecting the removable panel to the first retainer and the second retainer by engaging a first externally threaded connector with a first internally threaded connector, and engaging a second externally threaded connector and a second internally threaded connector.

Additional aspects and advantages of the invention will become more apparent upon further review of the detailed description of the illustrative embodiments taken in conjunction with the accompanying drawings.

DETAILED DESCRIPTION

Figure 1:
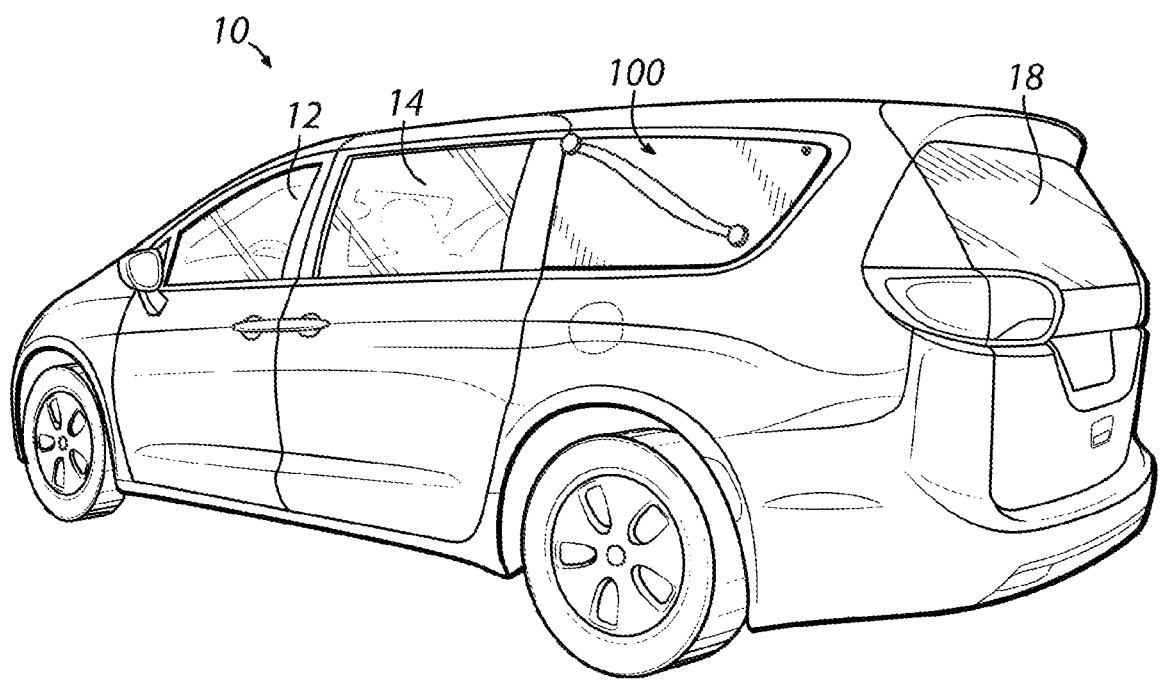
FIG. 1 is a perspective view of an illustrative vehicle comprising a removable panel assembly.
Figure 2:
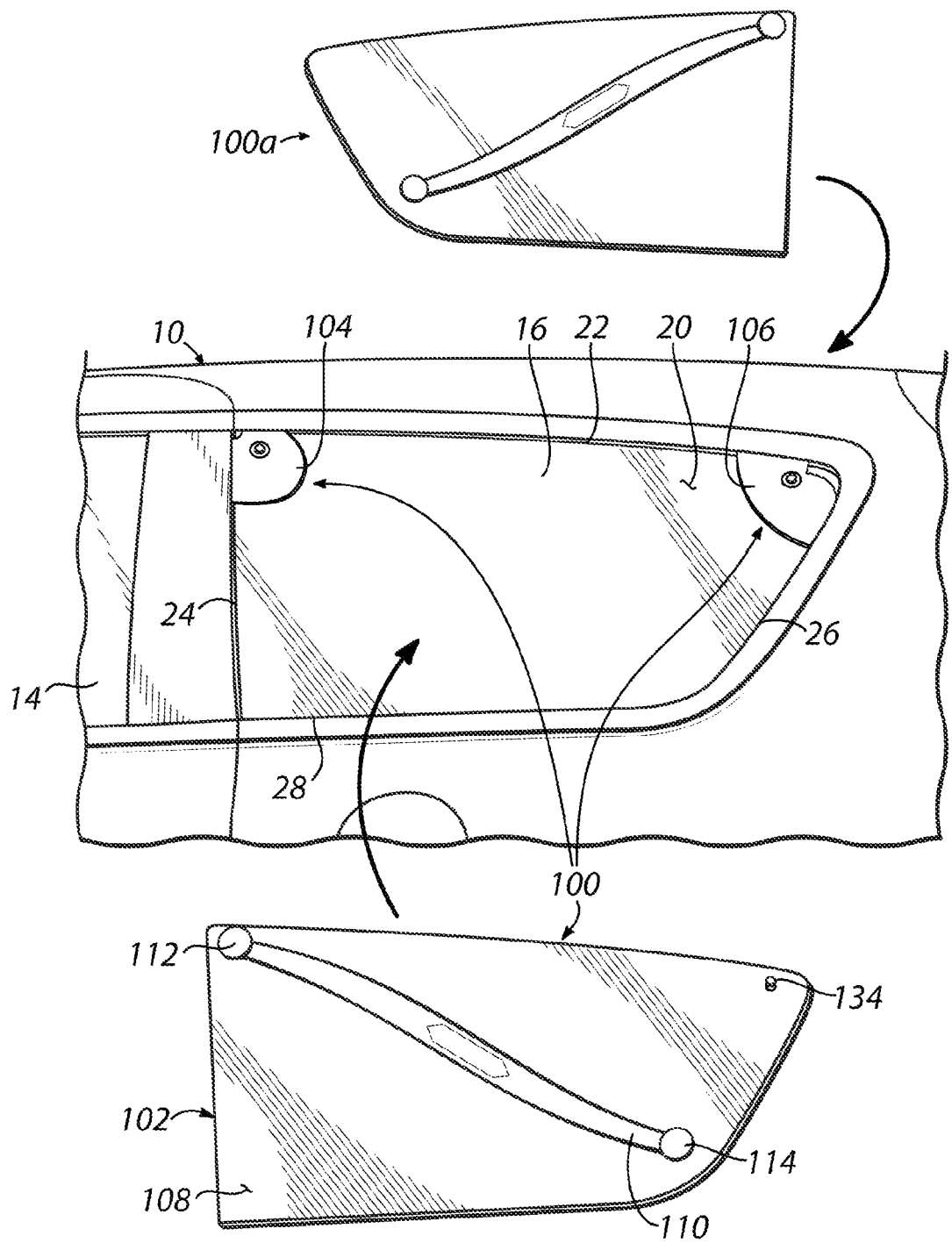
FIG. 2 is a detailed, exploded, side elevation view of the vehicle and the panel assembly.

Referring to FIGS. 1 and 2, the illustrative vehicle 10 includes various windows, such as side windows 12, 14, 16 and a rear window 18. The illustrative panel assembly 100 is configured to be removably attached to the rear-most side window 16. A second panel assembly 100*a*, which is similar to the panel assembly 100 except that it is substantially a mirror image of the panel assembly 100, may be removably attached to the corresponding window on the opposite side of the vehicle 10.

An illustrative vehicle ornamentation kit may comprise one or more removable panel assemblies. For example, a vehicle ornamentation kit may include a panel assembly 100 for a window on the left side of a vehicle 10 and a panel assembly 100*a* for a window on the right side of the vehicle. The panel assemblies 100, 100*a* may be purchased and installed by an end user of the vehicle, or the panel assemblies 100, 100*a* may be installed by a dealer or distributor prior to sale of the vehicle 10 to the end user. Accordingly, a vehicle 10 may comprise one or more vehicle windows 12, 14, 16, 18 and one or more illustrative panel assemblies 100, 100*a*.

Figure 8:
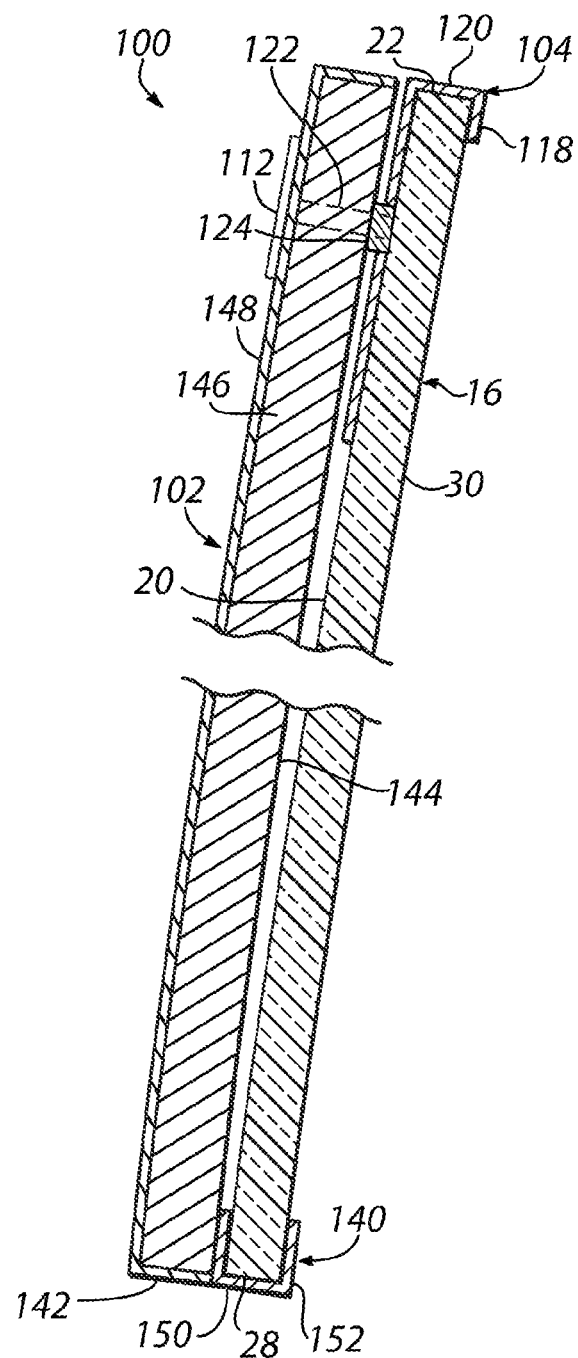
FIG. 8 is a cross-section view of an illustrative panel assembly installed on a vehicle window.

Generally, the window 16 comprises a pane of automotive glass having an outward-facing surface 20, various edges (e.g., a top edge 22, a forward edge 24, a rear edge 26, and a bottom edge 28), and an inward-facing surface 30 (FIG. 8).

The top edge 22 and the bottom edge 28 may be generally opposite each other and/or the forward edge 24 and the rear edge 26 may be generally opposite each other. Other illustrative embodiments may be configured for use on other windows 12, 14, 18.

The panel assembly 100 comprises a panel 102 that is sized and shaped to overlie at least a portion of the outward-facing surface 20 of the window 16. In some illustrative embodiments, the panel 102 may be generally the same size and shape as the window 16 so that the panel 102 substantially covers the entire outward-facing surface 20 of the window 16. In other illustrative embodiments, the panel 102 may overlie less than the entire window 16. For example, an alternative embodiment panel 102 may cover at least about 90% of the entire window 16.

The illustrative panel assembly 100 comprises a first retainer 104 and a second retainer 106 that are configured to secure the panel 102 in abutting relation to the window 16. As used herein, "in abutting relation" may describe a panel 102 that is partially or entirely in direct contact with all or a portion of the outward-facing surface 20 the window 16. As used herein, "in abutting relation" may also describe a panel 102 that is positioned substantially adjacent or alongside the outward-facing surface 20 of the window 16, with or without direct contact between the panel 102 and the window 16 and/or with or without a relatively small gap between some or all of the panel 102 and the window 16. In this illustrative embodiment, the first retainer 104 and the second retainer 106 are selectively connectable to the panel 102 and selectively detachable from the panel 102 as described in more detail below. The first retainer 104 and the second retainer 106 are readily engageable with and removable from the window 16.

The panel assembly 100 may include one or more ornamental elements disposed on an outward-facing surface 108 of the panel 102. For example, the illustrative panel assembly 100 comprises ornamental elements including a landau bar 110 and two landau buttons 112, 114 disposed on the outward-facing surface 108 of the panel 102. The landau bar 110 and/or the landau buttons 112, 114, may comprise a chrome surface. Alternatively, some assemblies 100 for funeral vehicles may include ornamental elements comprising wreaths, such as chrome wreaths. Other embodiments may include alternative ornamental elements, such as one or more indicia associated with a sports team, a trade, or a business, such as a nameplate, which may have a chrome surface.

Figure 3:
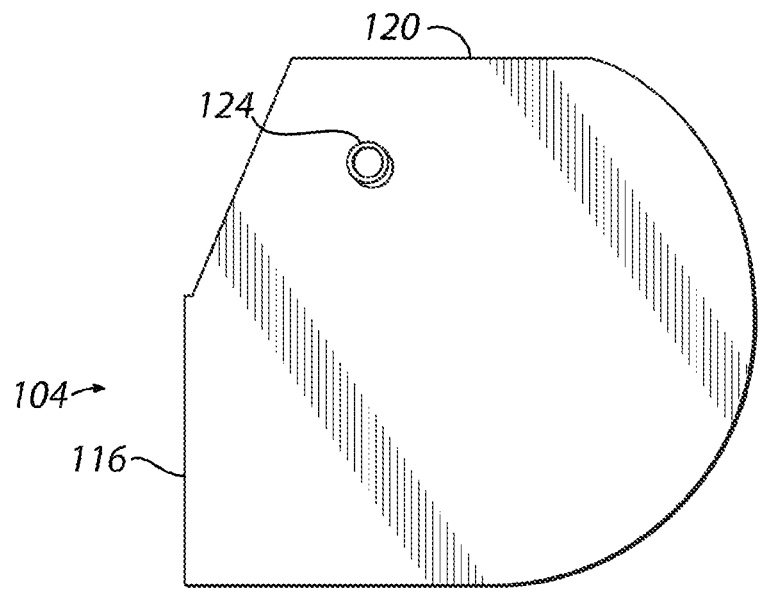
FIG. 3 is a front elevation view of an illustrative first retainer.
Figure 4:
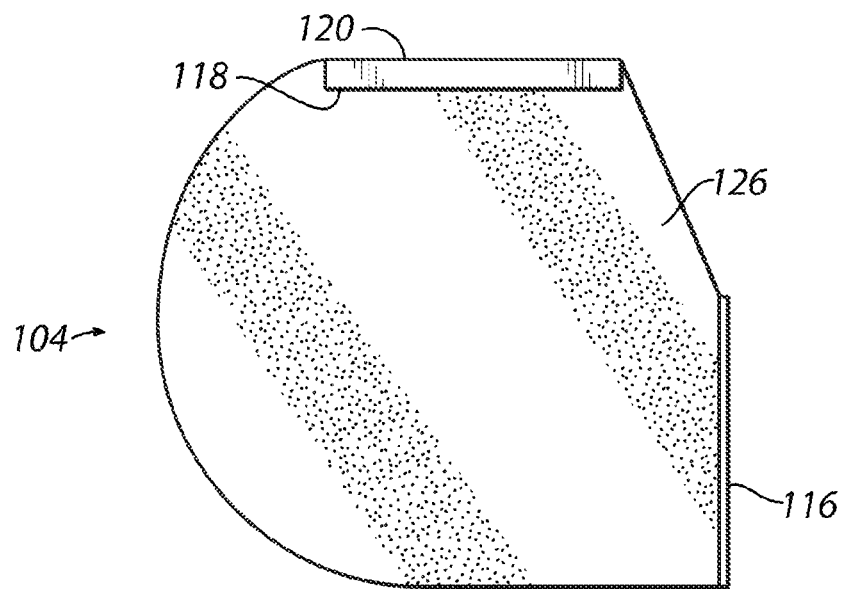
FIG. 4 is a rear elevation view of the first retainer.

Referring to FIGS. 2-4, the first retainer 104 comprises an engagement element 116, which is in the form of a flange configured to extend generally perpendicular to the outward-facing surface 20 and generally along the front edge 24 of the window 16. The engagement element 116 is configured to engage an edge, such as the front edge 24, of the window 16. Generally, by engaging the front edge 24 of the window 16, the engagement element 116 is configured to oppose rearward movement of the first retainer 104 with respect to the vehicle 10.

The first retainer 104 comprises an engagement element 118, which is in the form of the flange of a U-shaped channel extending along the inward-facing surface 30 of the window 16 proximate the top edge 22. The engagement element 118 is configured to engage the inward-facing surface 30 of the window 16. Generally, by engaging the inward-facing surface 30 of the window 16, the engagement element 118 is configured to oppose movement of the first retainer 104 laterally outwardly away from the window 16 with respect to the vehicle 10. The web of the U-shaped channel (e.g., the bottom of the "U") comprises an engagement element 120 configured to engage the top edge 22 of the window 16. Generally, by engaging the top edge 22 of the window 16, the engagement element 120 is configured to oppose downward movement of the first retainer 104 with respect to the vehicle 10.

In the illustrative embodiment, the first retainer 104 is selectively connectable to the panel 102 by engagement of a first externally threaded connector 122 (FIG. 7) with a first internally threaded connector 124. The first internally threaded connector 124 is in the form of a weld nut arranged to engage the first externally threaded connector 122 extending inwardly from the panel 102. The first retainer 104 is selectively detachable from the panel 102 by disengaging the first externally threaded connector 122 from the first internally threaded connector 124. Other embodiments may include alternative connectors, such as bolts, screws, clips, brackets, elastics cords, springs, clamps, etc.

In the illustrative embodiment, the first retainer 104 is constructed of generally planar metal which is bent to form the engagement element 116, the engagement element 118, and the engagement element 120. In some alternative embodiments, the first retainer 104 may be constructed of plastic, for example. Portions of the first retainer 104 are covered by padding 126, such as felt, which may protect the window 16 from scratches and other potential damage from the first retainer 104.

Figure 5:
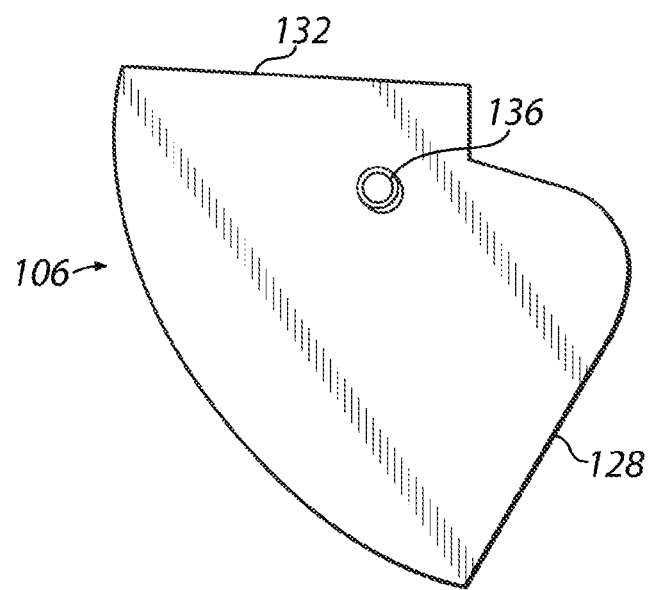
FIG. 5 is front elevation view of an illustrative second retainer.
Figure 6:
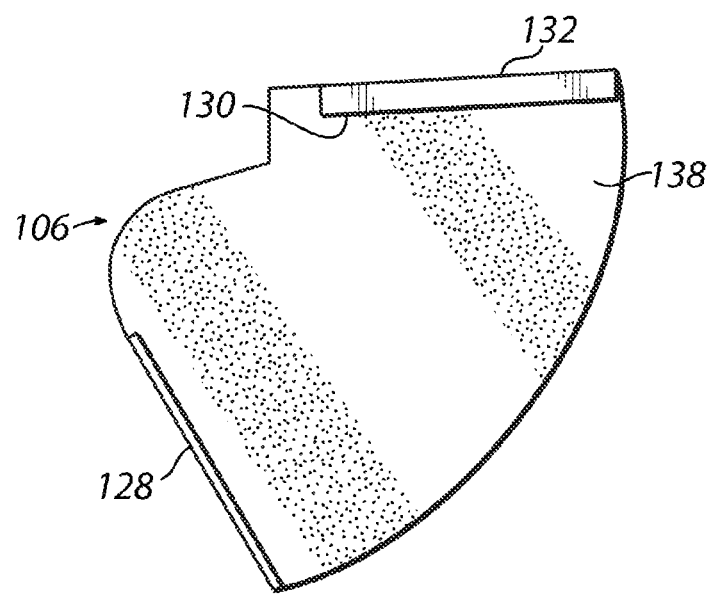
FIG. 6 is a rear elevation view of the second retainer.

Referring to FIGS. 2, 5, and 6, the second retainer 106 comprises an engagement element 128, which is in the form of a flange extending generally perpendicular to the outward-facing surface 20 and generally along the rear edge 26 of the window 16. The engagement element 128 is configured to engage an edge, such as the rear edge 26, of the window 16. Generally, by engaging the rear edge 26 of the window 16, the engagement element 128 is configured to oppose forward movement of the second retainer 106 with respect to the vehicle 10.

The second retainer 106 comprises an engagement element 130, which is in the form of the flange of a U-shaped channel extending along the inward-facing surface 30 of the window 16 proximate the top edge 22. The engagement element 130 is configured to engage the inward-facing surface 30 of the window 16. Generally, by engaging the inward-facing surface 30 of the window 16, the engagement element 130 is configured to oppose movement of the second retainer 106 laterally outwardly away from the window 16 with respect to the vehicle 10. The web of the U-shaped channel (e.g., the bottom of the "U") comprises an engagement element 132 configured to engage the top edge 22 of the window 16. Generally, by engaging the top edge 22 of the window 16, the engagement element 132 is configured to oppose downward movement of the second retainer 106 with respect to the vehicle 10.

In the illustrative embodiment, the second retainer 106 is selectively connectable to the panel 102 by engagement of a second externally threaded connector 134 (FIG. 7) with a second internally threaded connector 136. The second internally threaded connector 136 is in the form of a weld nut arranged to engage the second externally threaded connector 134 extending inwardly from the panel 134. The second retainer 106 is selectively detachable from the panel 102 by disengaging the second externally threaded connector 134 from the second internally threaded connector 136.

In the illustrative embodiment, the second retainer 106 is constructed of generally planar metal which has been bent to form the engagement element 128, the engagement element 130, and the engagement element 132. In some alternative example embodiments, the second retainer 106 may be constructed of plastic, for example. Portions of the first retainer 106 are covered by padding 138, such as felt, which may protect the window 16 from scratches and other potential damage from the second retainer 106.

Figure 7:
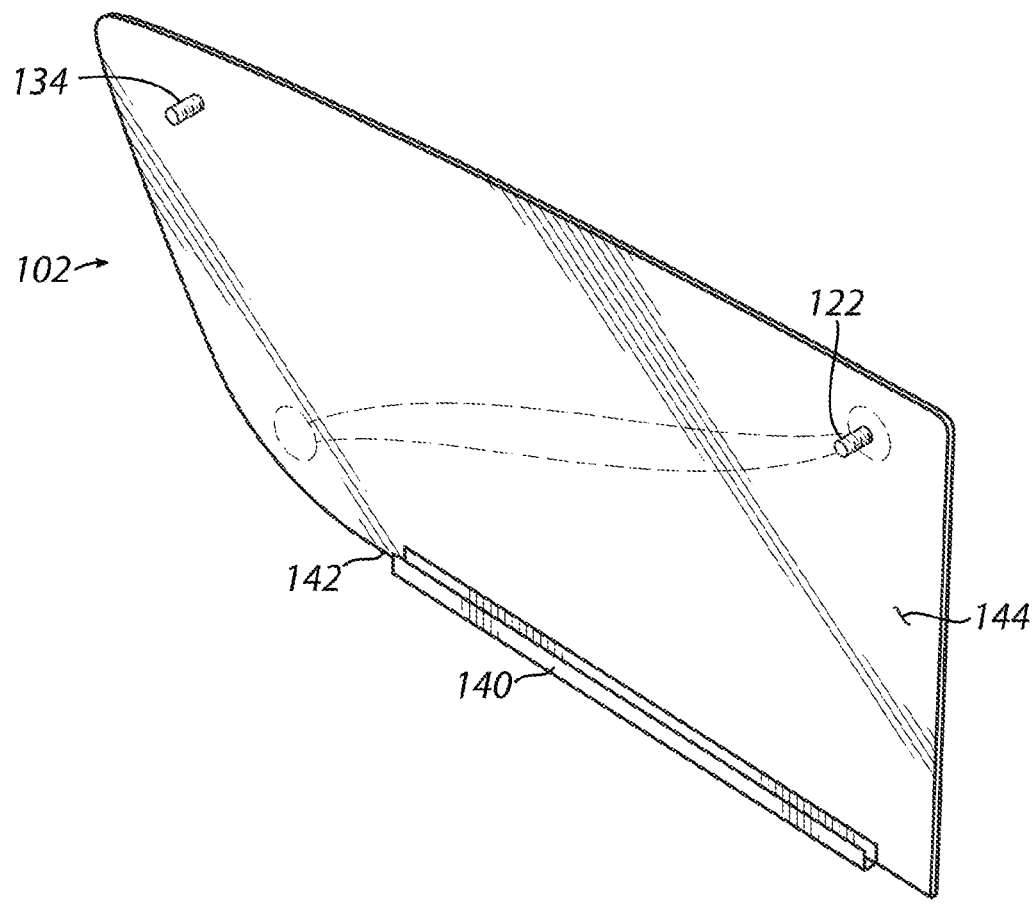
FIG. 7 is a rear perspective view of an illustrative panel.

Referring to FIGS. 2, 7, and 8, the panel 102 comprises a third retainer 140 configured to secure the panel in abutting relation to the window 16. The third retainer comprises an engagement element 150 configured to engage the bottom edge 28 of the window 16 and/or an engagement element 152 configured to engage the inward-facing surface 30 of the window 16. In this illustrative embodiment, the third retainer 140 comprises a generally U-shaped channel disposed proximate the bottom edge 142 of the panel 102. In this illustrative embodiment, the channel comprising the third retainer 140 is affixed to the inward-facing surface 144 of the panel. In other illustrative embodiments the third retainer 140 may be generally similar to the first and second retainers 104, 106 and/or may be selectively connectable to the panel 102, such as in a manner similar to the first and second retainers 104, 106.

Referring to FIG. 8, in this illustrative embodiment, when the first retainer 104 is connected to the panel 102, the first externally threaded connector 122 extends through the panel 102 to engage the first internally threaded connector 124 of the first retainer 104. In this illustrative embodiment, the landau button 112 is coupled to the first externally threaded connector 122. Similarly, referring to FIGS. 5, 7, and 8, when the second retainer 106 is connected to the panel 102, the second externally threaded connector 134 extends through the panel 102 to engage the second internally threaded connector 136 of the second retainer 106.

In the illustrative embodiment, the outward-facing surface 20 of the window 16 is generally curved, such as in a convex manner. When installed, the panel 102 substantially conforms to the curvature of the window 16. As used herein, "conform" may be used to describe a panel 102 having a shape that substantially corresponds to the curvature (if any) of the window 16. In some embodiments, the panel 102 may be pre-curved to substantially conform to the curvature of at least a portion of the outward-facing surface 20 of the window 16. As used herein, "pre-curved" may describe a panel 102 that, when removed from the window 16, generally remains in a shape corresponding to the curvature (if any) of the window 16. In some embodiments, the panel 102 may be flexible such that the panel 102 is bendable to substantially conform to the curvature of at least a portion of the outward-facing surface 20 of the window 16. In such embodiments, the panel 102 may be elastically deformable such that it may conform to the shape of the window 16 when installed while returning to another shape when removed.

In the illustrative embodiment, the panel 102 comprises a substrate 146 and a covering 148. The substrate 146 may comprise, for example, plastic, molded resin, fiberglass, sheet metal, and/or aluminum. The covering 148 may comprise, for example, paint and/or vinyl fabric. In some embodiments, the substrate 146 may be generally rigid (e.g., rigid fiberglass) and the covering 148 may be substantially flexible (e.g., vinyl fabric).

Figure 9:
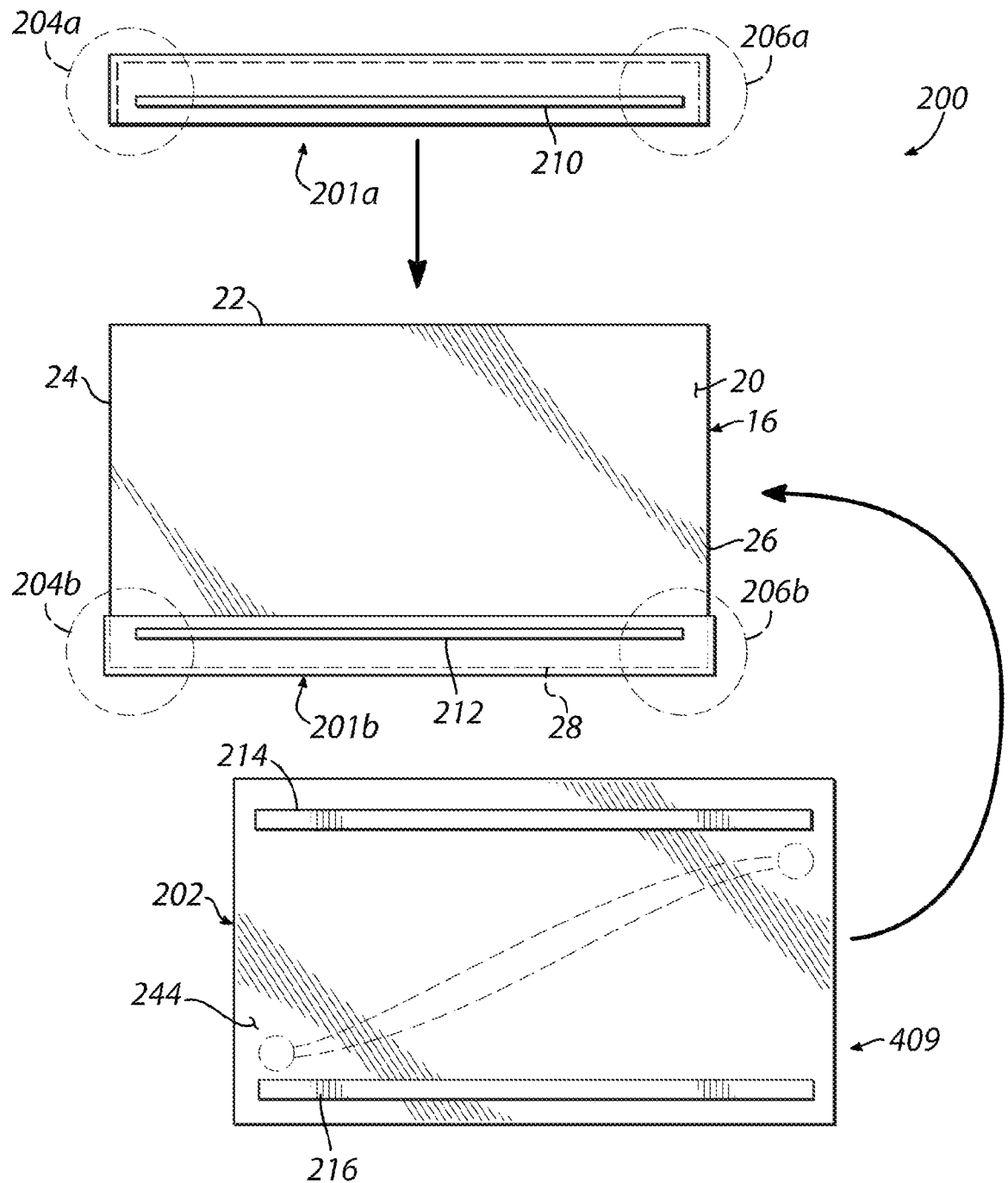
FIG. 9 is an exploded elevation view of an alternative illustrative panel assembly and a vehicle window.
Figure 10:
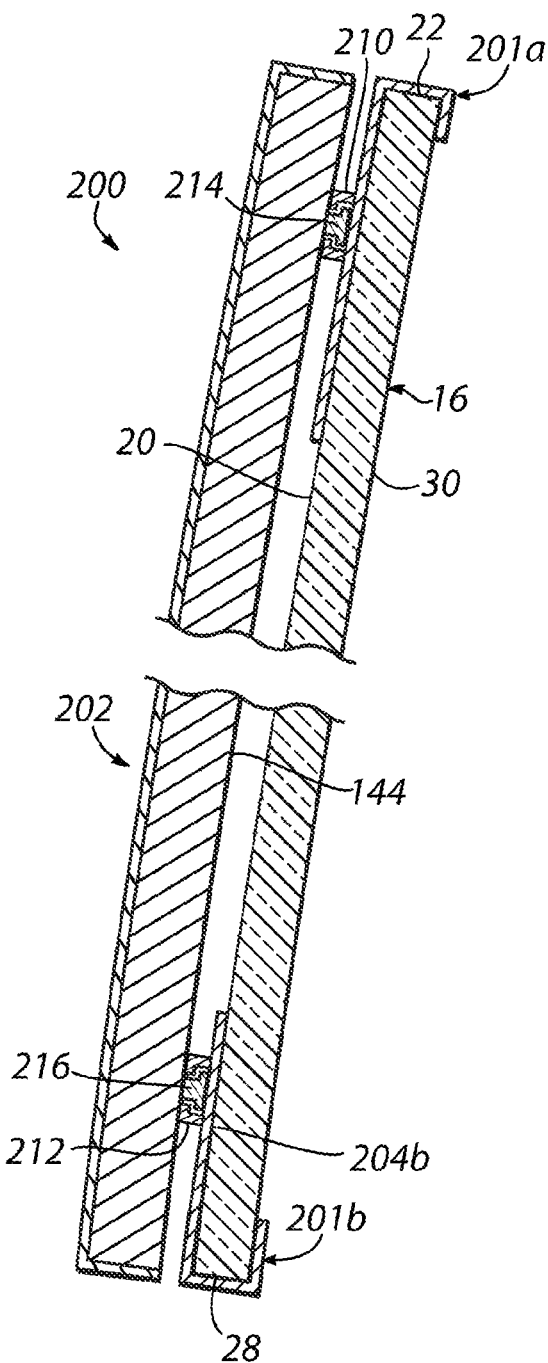
FIG. 10 is a cross-section view of the illustrative panel assembly installed on the vehicle window.

Referring to FIGS. 9 and 10, this alternative illustrative panel assembly 200 is generally similar to the panel assemblies described elsewhere herein, except for the features described below. Unless specifically indicated, the description of the structure and function or methodology of corresponding components with respect to the other panel assemblies described herein generally applies to the panel assembly 200.

The illustrative panel assembly 200 comprises a panel 202, a first retainer assembly 201a, and a second retainer assembly 201b. The first retainer assembly 201a and the second retainer assembly 201b are configured to secure the panel 202 in abutting relation to the window 16 and are selectively connectable to the panel 202 and are selectively detachable from the panel 202.

The first retainer assembly 201a comprises a first retainer 204a and a second retainer 206a, and the second retainer assembly 201b comprises a third retainer 204b and a fourth retainer 206b. Generally, each retainer 204a, 206a, 204b, 206b may be generally similar to the retainers 104, 106 described above with reference to the panel assembly 100, such as including engagement elements similar to engagement elements 116, 118, 128, 130. In this panel assembly 200, however, the first retainer 204a and the second retainer 206a are provided coupled together as part of the first retainer assembly 201a. Similarly, the third retainer 204b and the fourth retainer 206b, which may be generally similar to the retainers 104, 106 described above, are provided coupled together as part of the second retainer assembly 201b.

In this illustrative embodiment, the first retainer assembly 201a is oriented generally horizontally, such as along the top edge 22 of the window 16 with the first retainer 204a engaging the forward edge 24, the top edge 22, and/or the inward-facing surface 30 and the second retainer 206a engaging the rear edge 26, the top edge 22, and/or the inward-facing surface 30. Similarly, the second retainer assembly 201b is oriented generally horizontally, such as along the bottom edge 28 of the window 16 with the third retainer 204b engaging the forward edge 24, the bottom edge 28, and/or the inward-facing surface 30 and the fourth retainer 206b engaging the rear edge 26, the bottom edge 28, and/or the inward-facing surface 30.

In this illustrative embodiment, each of the first retainer assembly 201a and the second retainer assembly 201b includes a respective retainer assembly track 210, 212, which is configured to slidably engage a corresponding panel track 214, 216, disposed on the inward-facing surface 244 of the panel. The tracks 210, 212, 214, 216 of the first retainer assembly 201a, the second retainer assembly 201b, and the panel 202 are oriented generally horizontally. Accordingly, the panel 202 is selectively connectable to and selectively detachable from the retainer assemblies 201a, 201b by sliding the panel 202 generally horizontally with respect to the window 16 (e.g., generally forward or rearward with respect to the vehicle 10). Specifically, the corresponding tracks 210, 212, 214, 216 are aligned and the panel 202 is slid relative to the retainer assemblies 201a, 201b to engage (or disengage) the tracks 210, 212, 214, 216.

Figure 11:
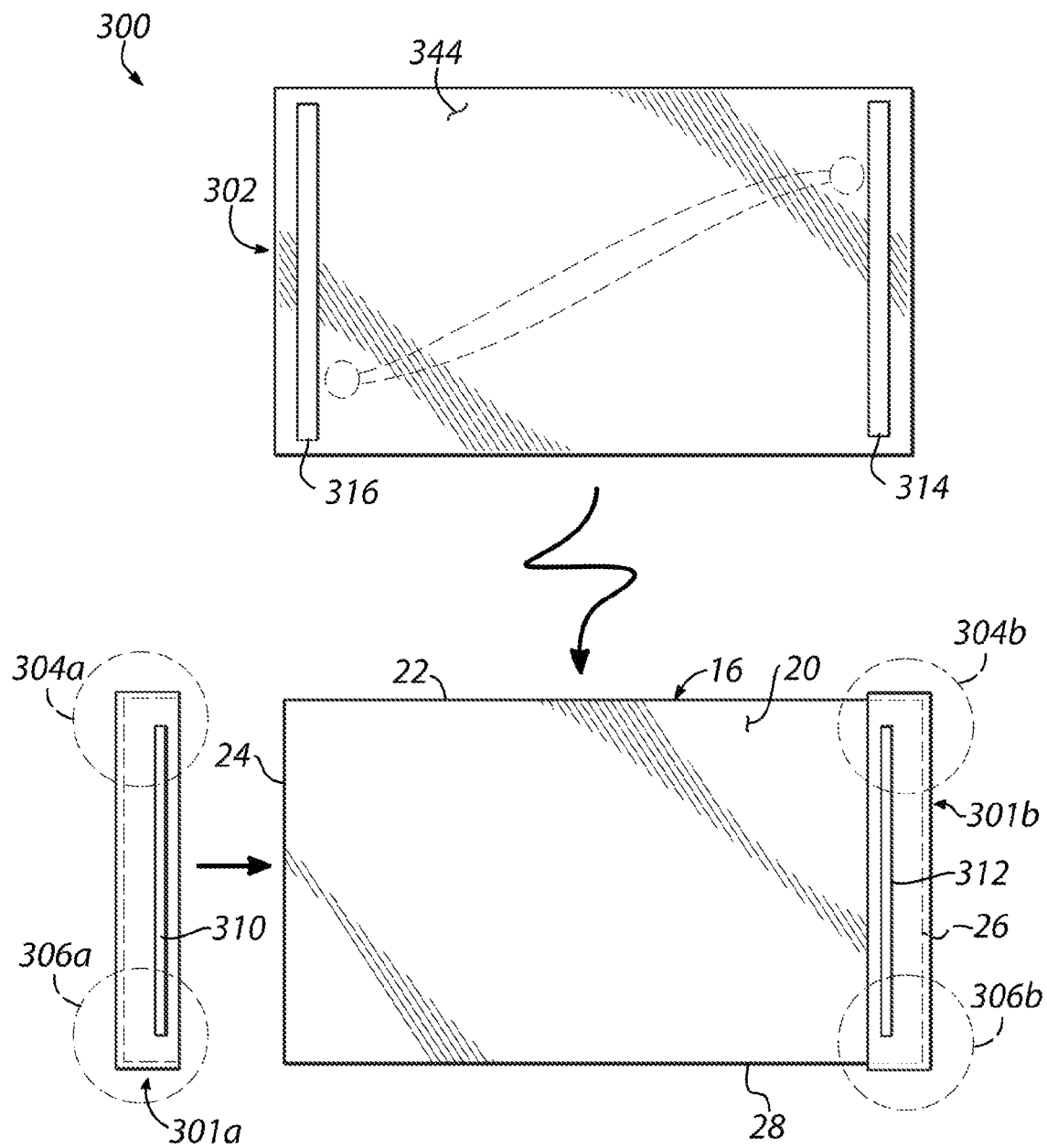
FIG. 11 is an exploded elevation view of an alternative illustrative embodiment panel assembly.

Referring to FIG. 11, this alternative illustrative panel assembly 300 is generally similar to the panel assemblies described elsewhere herein, except for the features described below. Unless specifically indicated, the description of the structure and function or methodology of corresponding components with respect to the other panel assemblies described herein generally applies to the panel assembly 300. More specifically, this alternative illustrative panel assembly 300 is similar to the panel assembly 200 of FIGS. 9 and 10, except that the first retainer assembly 301a and the second retainer assembly 301b of the panel assembly 300 are positioned generally vertically, such as along the forward edge 24 and the rear edge 26 of the window 16, respectively, instead of generally horizontally as in the panel assembly 200.

The illustrative panel assembly 300 comprises a panel 302, a first retainer assembly 301a, and a second retainer assembly 301b. The first retainer assembly 301a and the second retainer assembly 301b are configured to secure the panel 302 in abutting relation to the window 16 and are selectively connectable to the panel 302 and are selectively detachable from the panel 302 as described in more detail below.

The first retainer assembly 301a comprises a first retainer 304a and a second retainer 306a, and the second retainer assembly 301b comprises a third retainer 304b and a fourth retainer 306b. Generally, each retainer 304a, 306a, 304b, 306b may be generally similar to the retainers 104, 106 described above with reference to the panel assembly 100, such as including engagement elements similar to engagement elements 116, 118, 128, 130. In this panel assembly 300, however, the first retainer 304a and the second retainer 306a are provided coupled together as part of the first retainer assembly 301a. Similarly, the third retainer 304b and the fourth retainer 306b, which may be generally similar to the retainers 104, 106 described above, are provided coupled together as part of the second retainer assembly 301b.

In this illustrative embodiment, the first retainer assembly 301a is oriented generally vertically, such as along the forward edge 24 of the window 16 with the first retainer 304a engaging the forward edge 24, the top edge 22, and/or the inward-facing surface 30 and the second retainer 306a engaging the bottom edge 28, the forward edge 24, and/or the inward-facing surface 30. Similarly, the second retainer assembly 301b is oriented generally vertically, such as along the rear edge 26 of the window 16 with the third retainer 304b engaging the rear edge 26, the top edge 22, and/or the inward-facing surface 30 and the fourth retainer 306b engaging the rear edge 26, the bottom edge 28, and/or the inward-facing surface 30.

Each of the first retainer assembly 301a and the second retainer assembly 301b includes a respective retainer assembly track 310, 312, which is configured to slidably engage a corresponding panel track 314, 316, disposed on the inward-facing surface 344 of the panel. The tracks 310, 312, 314, 316 of the first retainer assembly 301a, the second retainer assembly 301b, and the panel 302 are oriented generally vertically. Accordingly, the panel 302 is selectively connectable to and selectively detachable from the retainer assemblies 301a, 301b by sliding the panel 302 generally vertically with respect to the window 16 (e.g., generally upward or downward). Specifically, the corresponding tracks 310, 312, 314, 316 are aligned and the panel 302 is slid relative to the retainer assemblies 301a, 301b engage (or disengage) the tracks 310, 312, 314, 316.

Figure 12:
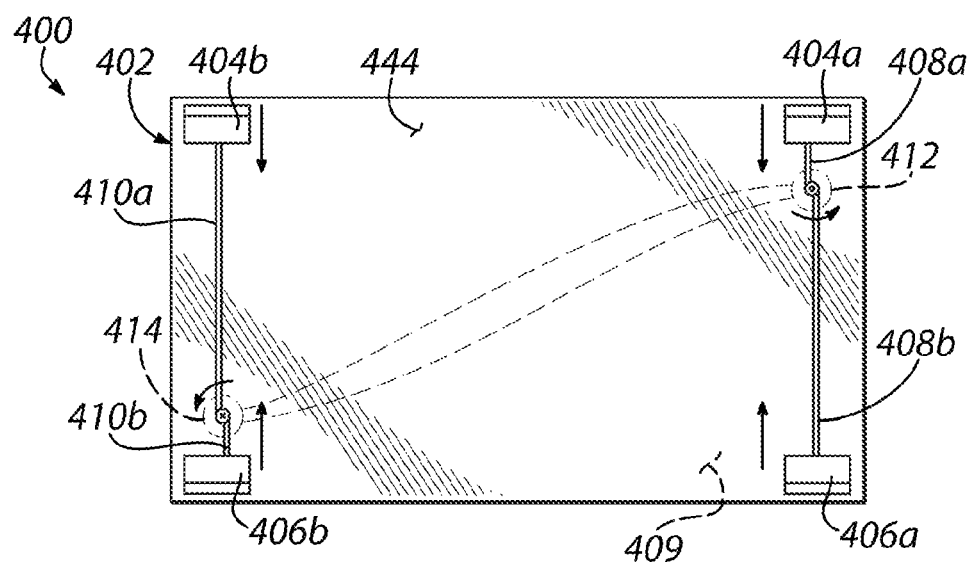
FIG. 12 is an elevation view of an inward-facing surface of an alternative illustrative embodiment panel assembly.

FIG. 12 is an elevation view of an inward-facing surface 444 of an alternative illustrative embodiment panel assembly 400, according to at least some aspects of the present disclosure. This alternative illustrative panel assembly 400 is generally similar to the panel assemblies described elsewhere herein, except for the features described below. Unless specifically indicated, the description of the structure and function or methodology of corresponding components with respect to the other panel assemblies described herein generally applies to the panel assembly 400.

The panel assembly 400 comprises retainers 404a, 406a, 404b, 406b, one or more of which is movably disposed on the panel 402, such as generally vertically, to selectively engage with and disengage from the window 16. Alternative embodiments may include a similar arrangement in which one or more of the retainers 404a, 406a, 404b, 406b is configured to move generally horizontally to engage with and disengage from the window 16.

In the illustrative embodiment of FIG. 12, the retainers 404a, 406a, 404b, 406b are movably disposed on the inward-facing surface 444 of the panel 402. The retainers 404a, 406a, 404b, 406b may be operatively connected to a respective tightening mechanism, such as linkages 408a, 408b, 410a, 410b. The tightening mechanisms may be operatively coupled for actuation by movement of one or more ornamental elements, such as landau buttons 412, 414 disposed on the outward-facing surface 409 of the panel 402. For example, linkages 408a, 408b are coupled to landau button 412 and/or linkages 410a, 410b are coupled to landau button 414. Rotation of the landau buttons 412, 414 in the clockwise direction is operative to move the retainers 404a, 406a, 404b, 406b to engage the window 16, such as one or more of the edges 22, 24, 26, 28 of the window 16 (FIG. 2) (e.g., toward the horizontal midline of panel 402). Similarly, rotation of the landau buttons 412, 414 in the counter-clockwise direction is operative facilitate disengagement of the retainers 404a, 406a, 404b, 406b from the window 16.

Figure 13:
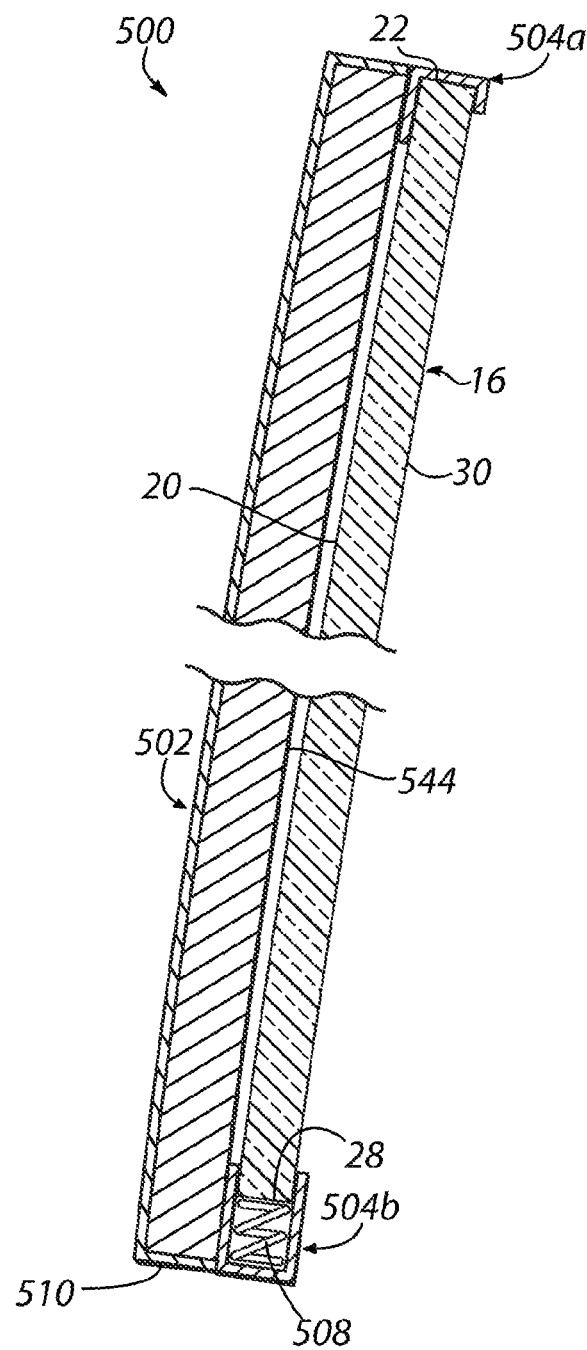
FIG. 13 is a cross-section view of an alternative illustrative panel assembly 500 installed on a vehicle window.

FIG. 13 is a cross-section view of an alternative illustrative panel assembly 500 installed on a vehicle window 16, according to at least some aspects of the present disclosure. This alternative illustrative panel assembly 500 is generally similar to the panel assemblies described elsewhere herein, except for the features described below. Unless specifically indicated, the description of the structure and function or methodology of corresponding components with respect to the other panel assemblies described herein generally applies to the panel assembly 500.

This illustrative panel assembly 500 comprises a panel 502 with retainers 504a, 504b disposed on the inward-facing surface 544 thereof. The retainer 504a is configured to engage the window 16, such as the top edge 22 and/or the inward-facing surface 30 of the window 16. The retainer 504a may be in the form of an elongated channel that extends along the upper edge of the panel 502.

The retainer 504b is configured to engage the window 16, such as the bottom edge 28 and/or the inward-facing surface 30 of the window 16. The retainer 504b may be in the form of an elongated channel that extends along the bottom edge of the panel 502. The retainer 504b comprises a biasing element, such as a compression spring 508, configured to bias the panel 502 to hold the retainer 504a in engagement with the window 16. More specifically, in this illustrative embodiment, the compression spring 508 is disposed in the channel of the retainer 504b and is configured to bias the panel 502 generally downward with respect to the window 16, which holds the retainer 504a in engagement with the top edge 22 of the window 16.

Various exemplary panel assemblies according to at least some aspects of the present disclosure may particularly useful in connection with vehicle windows that are fixed (e.g., not openable, closable, or otherwise movable). However, some exemplary embodiments may be used in connection with vehicle windows that are movable, such as pivotable between open and closed positions.

Some exemplary embodiments according to at least some aspects of the present disclosure may include alternative engagement elements. An alternative engagement element may comprise a connector affixed to the vehicle 10 by adhesive. For example, a connector may be secured to the outward-facing surface 20 of the window 16 by doublesided adhesive tape. As another example, an alternative engagement element may comprise a pair of magnets and/or a magnet and a ferromagnetic component arrangement. For example, the magnet may be affixed to the panel and the ferromagnetic component may be positioned on the inward-facing surface 30 of the window 16 so that magnetic attraction between the magnet and the ferromagnetic component holds the panel on the window.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A removable panel assembly for a vehicle window, the panel assembly comprising:
   a removable panel sized and shaped to overlie at least a portion of an outward-facing surface of a vehicle window;
   a first retainer configured to secure the panel in abutting relation to the window, the first retainer including a first engagement element configured to engage a first edge of the window and a second engagement element configured to engage an inward-facing surface of the window; and
   a second retainer configured to secure the panel in abutting relation to the window, the second retainer including a third engagement element configured to engage a second edge of the window and a fourth engagement element configured to engage the inward-facing surface of the window.

2. The panel assembly of claim 1, wherein at least one of the first retainer or the second retainer are selectively connectable to the panel and selectively detachable from the panel.

3. The panel assembly of claim 2, wherein when the first retainer is connected to the panel, the first retainer extends through the panel, and
   when the second retainer is connected to the panel, the second retainer extends through the panel.

4. The panel assembly of claim 1, wherein the first edge and the second edge are generally opposite edges of the window.

5. The panel assembly of claim 1, wherein the outward-facing surface of the window is curved, and
   the panel is pre-curved to substantially conform to at least the portion of the outward-facing surface of the window.

6. The panel assembly of claim 1, wherein the outward-facing surface of the window is curved, and
   the panel is flexible such that the panel is bendable to substantially conform to at least the portion of the outward-facing surface of the window.

7. The panel assembly of claim 1, wherein the panel comprises at least one ornamental element disposed on an outward-facing surface of the panel.

8. The panel assembly of claim 7, wherein the at least one ornamental element comprises a landau bar and at least one landau button.

9. The panel assembly of claim 8,
   wherein the first retainer is selectively connectable to the panel by engagement of a first externally threaded connector with a first internally threaded connector;
   wherein, when the first retainer is connected to the panel, at least one of the first externally threaded connector and the first internally threaded connector extends through the panel, the first externally threaded connector engages the first internally threaded connector, the first retainer comprising the first internally threaded connector; and
   wherein the at least one landau button is coupled to at least one of the first externally threaded connector and the first internally threaded connector.

10. The panel assembly of claim 7, wherein the at least one ornamental element comprises an indicium associated with at least one of a sports team, a trade, or a business.

11. The panel assembly of claim 1, wherein the panel comprises a substrate and at least one of a covering or a coating;
    wherein the substrate comprises at least one of plastic, molded resin, fiberglass, sheet metal, or aluminum.

12. The panel assembly of claim 11, wherein the substrate is generally rigid, and the covering is substantially flexible.

13. The panel assembly of claim 11, wherein the covering comprises vinyl fabric.

14. A removable panel assembly for a vehicle window, the panel assembly comprising:
    a removable panel sized and shaped to overlie at least a portion of an outward-facing surface of a vehicle window;
    a first retainer configured to secure the panel in abutting relation to the window, the first retainer including a first engagement element configured to engage a first edge of the window and a second engagement element configured to engage an inward-facing surface of the window; and
    a second retainer configured to secure the panel in abutting relation to the window, the second retainer including a third engagement element configured to engage a second edge of the window and a fourth engagement element configured to engage the inward-facing surface of the window;
    wherein at least one of the first retainer or the second retainer is movably disposed on the inward-facing surface of the panel to selectively engage with the window.

15. The panel assembly of claim 14, further comprising a first tightening mechanism operatively coupled to at least one of the first retainer or the second retainer, the first tightening mechanism being configured to move at least one of the first retainer or the second retainer to engage the window.

16. A removable panel assembly for a vehicle window, the panel assembly comprising:
    a removable panel sized and shaped to overlie at least a portion of an outward-facing surface of a vehicle window;
    a first retainer configured to secure the panel in abutting relation to the window, the first retainer including a first engagement element configured to engage a first edge of the window and a second engagement element configured to engage an inward-facing surface of the window; and a second retainer configured to secure the panel in abutting relation to the window, the second retainer including a third engagement element configured to engage a second edge of the window and a fourth engagement element configured to engage the inward-facing surface of the window;

wherein the first edge of the window is generally opposite the second edge of the window, and the second retainer comprises a biasing element configured to bias the panel to hold the first engagement element in engagement with the first edge of the window.

17. The panel assembly of claim 16, wherein the first retainer is configured to engage a top edge of the window, and the biasing element is configured to bias the panel generally downward.

18. The panel assembly of claim 16, wherein the second retainer comprises an elongated channel, and the biasing element is disposed in the channel.

* * * * *